US008255676B2

(12) United States Patent
Delaney et al.

(10) Patent No.: US 8,255,676 B2
(45) Date of Patent: Aug. 28, 2012

(54) NON-DISRUPTIVE METHODS FOR UPDATING A CONTROLLER OF A STORAGE SYSTEM

(75) Inventors: William Patrick Delaney, Wichita, KS (US); Kenneth F. Day, Tucson, AZ (US)

(73) Assignee: Netapp, Inc., Sunnyvale, CA (US)

( * ) Notice: Subject to any disclaimer, the term of this patent is extended or adjusted under 35 U.S.C. 154(b) by 437 days.

(21) Appl. No.: 12/507,700

(22) Filed: Jul. 22, 2009

(65) Prior Publication Data
US 2011/0022828 A1 Jan. 27, 2011

(51) Int. Cl.
*G06F 9/44* (2006.01)
(52) U.S. Cl. ........... 713/1; 713/2; 700/7; 700/8; 700/19; 700/21; 700/82; 714/12
(58) Field of Classification Search ................. 713/1, 2; 700/7, 8, 19, 21, 82; 714/12
See application file for complete search history.

(56) References Cited

U.S. PATENT DOCUMENTS

| 6,108,684 | A | * | 8/2000 | DeKoning et al. ............ 718/105 |
| 6,675,258 | B1 | | 1/2004 | Bramhall et al. |
| 7,376,756 | B2 | | 5/2008 | Delaney et al. |
| 7,600,055 | B2 | * | 10/2009 | Douglas et al. ................. 710/19 |
| 7,685,461 | B2 | * | 3/2010 | Brundidge et al. .......... 714/6.12 |
| 7,937,513 | B2 | * | 5/2011 | Ohno et al. .................... 710/74 |
| 2005/0091426 | A1 | * | 4/2005 | Horn et al. ...................... 710/33 |

* cited by examiner

*Primary Examiner* — M Elamin
(74) *Attorney, Agent, or Firm* — Haynes and Boone, LLP

(57) ABSTRACT

A non-disruptive method for updating firmware in a first controller 210 of a redundant controller 200 in a storage subsystem 120 is disclosed. This updating occurs while the storage subsystem 120 presents data to a host system 130 in response to a host request 132. During the non-disruptive updating, the updating first controller 210 redirects the host request 132 for data, e.g., drive-A volume 252 normally owned by the first controller 210, to second controller 220 of the redundant controller 200. After the second controller 220 obtains data 134 identified in the host request 132, the operating second controller 220 transfers the data 134 to the updating first controller 210 via an inter-controller channel 202. Once the updating first controller 210 receives the data 134, the first controller 210 presents the data 134 to the host system 130. The host system 130 does not detect that the first controller 210 is updating because the updating process is invisible to the host system 130. The above process is also applied when the updating is simply a reboot command for the first controller 210.

20 Claims, 4 Drawing Sheets

NON-DISRUPTIVE METHODS FOR UPDATING A CONTROLLER OF A STORAGE SYSTEM

BACKGROUND OF THE INVENTION

A wide variety of electronic devices include storage subsystems. One type of storage subsystem providing significant storage capacity utilizes a plurality of redundant array of inexpensive disks which is referred to as a RAID. RAID storage subsystems include a controller that performs significant management functions to improve reliability and performance. The controller has complex firmware containing stored programmed instructions for performing RAID storage management processes.

When a host system attempts to access the storage subsystem during a reboot, the host system often experiences service disruption. One traditional approach to a disruption is to direct the storage subsystem to respond with a 'Device Not Ready' indication to the host system. This approach prevents the host system from accessing the storage subsystem during and upgrade and reboot. Some host systems are equipped with high-availability feature sets that react to persistent 'Device Not Ready' indications by attempting to activate a redundant 'fail-over' path to the storage subsystem that activates an alternate storage controller. While full access to the storage subsystem can be achieved in this manner, it is definitely not transparent and is a burden on resources.

SUMMARY OF THE INVENTION

An embodiment may therefore comprise a method for updating firmware in a storage subsystem so that the updating is transparent to a host system that sends a host request for data located in the storage subsystem, the method comprising: providing a redundant controller in the storage subsystem, the redundant controller comprising a first controller and a second controller; opening an inter-controller channel inside the redundant controller between the first controller and the second controller for communicating the host request and the data between the first controller and the second controller; receiving a firmware file in the first controller from a management system, the firmware file comprising: metadata describing the content of the firmware file and controller program instructions; routing the host request for data owned by the first controller to the second controller via the inter-controller channel after the receiving the firmware file; processing the host request with the second controller for the data owned by the first controller, which causes the data to be presented to the second controller, after the routing the host request for data owned by the first controller; transferring the data from the second controller to the first controller via the inter-controller channel; presenting the data from the first controller to the host system; and updating the firmware in the first controller according to the firmware file controller program instructions during at least one of the routing, the processing, the transferring, and the presenting processes.

Another embodiment may therefore comprise a non-disruptive method for updating a storage subsystem having a redundant controller so that the updating is transparent to a host system that sends a host request for data located in a storage subsystem controlled by the redundant controller, the method comprising: providing a first controller and a second controller in the redundant controller; opening an inter-controller channel connected between the first controller and the second controller for communicating the data between the first controller and the second controller; receiving a firmware file in the first controller from a management system, the firmware file comprising at least a reboot command; routing the host request for data owned by the first controller to the second controller via the inter-controller channel after receiving the firmware file; processing the host request with the second controller for the data owned by the first controller, which causes the data to be presented to the second controller, after the routing the host request for data owned by the first controller; transferring the data from second controller to the first controller via the inter-controller channel; presenting the data from the first controller to the host system; and rebooting the first controller according to the firmware file reboot command during at least one of the routing, the processing, the transferring, and the presenting processes.

DETAILED DESCRIPTION OF THE EMBODIMENTS

Figure 1:
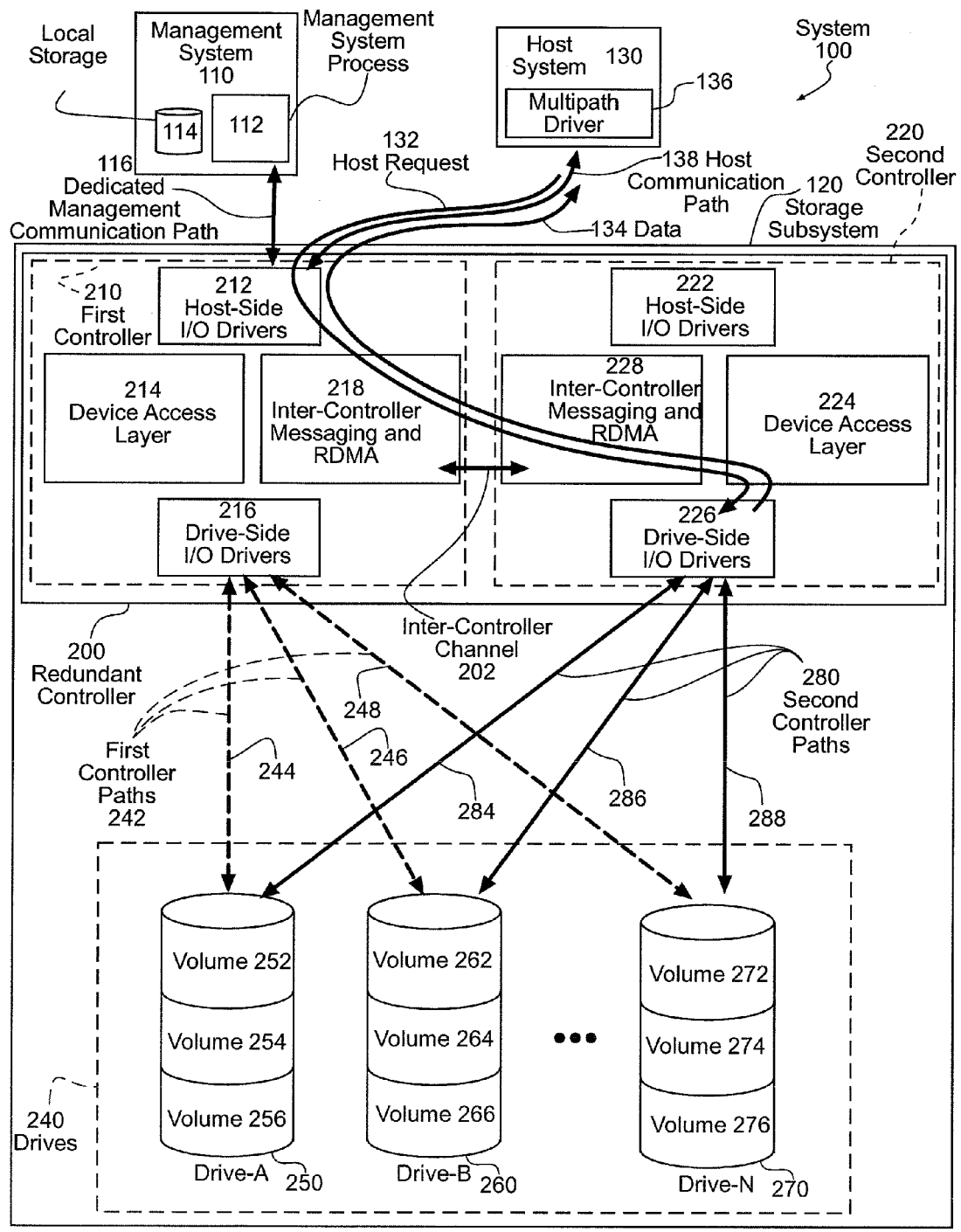
FIG. 1 is a high-level block diagram illustrating a system having a storage subsystem.

FIG. 1 is a high-level block diagram illustrating a system 100 including a management system 110, a storage subsystem 120 and a host system 130. In general terms, the host system 130 sends a host request 132 to the storage subsystem 120 to retrieve stored data 134. The storage subsystem 120 operates as directed by complex firmware containing controller program instructions for performing a storage management processes. Occasionally, the firmware needs to be updated to address issues, optimize performance or discover and inventory backend devices, such as drives. System 100 includes methods for updating firmware for controllers in the storage subsystem 120 without interrupting the intended function of the system 100, i.e., supplying data 134 to the host system 130. The methods include redirecting a host request 132 from an updating controller (e.g. a first controller 210) to a fully operating controller (e.g. a second controller 220) of a redundant controller 200 and presenting the data 134 from the first controller 210 so that the first controller 210 appears to be fully operating to the host system 130 while the first controller 210 is updating. This updating brings at least one controller 210 of storage subsystem 120 to new and improved level of device firmware while continually presenting data on the drives 240 to the host system 130. If the host system 130 can operate throughout the device upgrade process with no awareness that the upgrade is occurring, the process can be considered 'transparent', and therefore non-disruptive with respect to the ongoing operations of the storage subsystem 120. One of the biggest challenges in presenting the image of a transparent upgrade is the need for the controller(s), e.g. first controller 210, to restart (i.e. 'reboot', or 're-initialize') in order to load and activate the new functional level of device firmware. Complex storage devices require an involved and therefore lengthy restart process. The first controller 210 restart usually requires subsequent discovery and inventory processes to identify all of the physical devices (e.g. drive-A 250, drive-B 260 and drive-N 270) that are part of the storage subsystem 120.

With continued reference to FIG. 1, the system 100 includes the management system 110. The management system 110 includes a management client process 112 and an associated local storage 114. The management client process 112, in general, provides a user interface from an administrative user to manage storage subsystem 120. Management client process 112 within management system 110 interfaces to the first controller 210 via a dedicated management communication path 116. The management client process 112 transmits an update firmware file to the first controller 210 via the dedicated management communication path 116. Beyond the file transfer, management client process 112 and management system 110 have few or no further responsibilities in insuring coordination and completion of the firmware update process. Rather, first and second controllers 210, 220 cooperate in accordance with the present invention to complete the firmware update and synchronization process independent of management system 110 and in a manner that is seamless with respect to operation of the storage subsystem 120 and attached host systems 130. It is noted that the present system 100 and associated methods are similar to, but different from, the system disclosed in U.S. Pat. No. 6,675,258 of Bramhall et al. issued on Jan. 6, 2004. U.S. Pat. No. 6,675,258 was co-invented by at least one of the inventors of the present application. U.S. Pat. No. 6,675,258 is hereby specifically incorporated herein by reference for all that it discloses and teaches.

FIG. 1 shows attached host system 130 that includes a multipath driver 136 for communicating with the first controller 210 of storage system 120 via a host communication path 138. In general terms, the host system 130 generates a host request 132 that is sent to the storage subsystem 120 via the multipath driver 136 and the host communication path 138.

Referring still to FIG. 1, the system 100 is provided with a storage subsystem 120 that includes a redundant controller 200 and a plurality of drives 240. The redundant controller 240 includes a first controller 210 and a second controller 220 that are capable of processing the host request 132 from the host system 130 via the host communication path 138. The first controller 210 includes host-side I/O drivers 212, device access layer 214, drive side I/O drivers 216, and inter-controller messaging and remote direct memory access (RDMA) 218. The device access layer 214 is for storing firmware that, when executed, defines operation of first controller 210. Second controller 220 includes host-side I/O drivers 222, device access layer 224, drive side I/O drivers 226, and inter-controller messaging and remote direct memory access (RDMA) 228. The device access layer 224 is for storing firmware that, when executed, defines operation of second controller 220. It is important to ensure compatibility between revisions of firmware operating in the cooperating controllers 210 and 220. Controllers 210 and 220 of the present invention cooperate via an inter-controller channel 202 to manage the download, update, synchronize processing of the firmware operating in the controllers, and transfer data obtained from the drives 240 in response to the host request 132 from the host system 130.

FIG. 1 also shows that the plurality of drives 240 may include individual drive-A 250, drive-B 260 and drive-N 270, where "N" refers to the total number of drives located in the storage subsystem 120. The drives 240 are commonly divided into subsets referred to as volumes (e.g. volume 252, volume 254 and volume 256 of drive-A 250). Drive-B 260 may be configured with volumes such as, for example, volume 262, volume 264 and volume 266. Drive-N 270 may be configured with volumes such as, for example, volume 272, volume 274 and volume 276. In the case of RAID storage management, it is common to refer to the subsets as logical units 'LUNs' or redundancy groups. As used herein, the term volume or storage volume is intended to represent all such logical groupings that subdivide the drives. It should be noted that the subdivision may be as simple as defining a single storage volume that includes all disk drives of the system 100. Storage subsystem 120 is provided with a plurality of first controller paths 242, such as first controller path A 244, first controller path B 246 and first controller path N 248. First controller paths 242 connect the drive side I/O drivers 216 of the first controller 210 to the drives 240. For example, first controller path A 244 provides a communication path between first controller drive side I/O drivers 216 and the volumes, e.g. volume 252, of drive-A 250.

The storage subsystem 120, illustrated in FIG. 1, is provided with a plurality of second controller paths 280, such as second controller path A 284, second controller path B 286 and second controller path N 288. Second controller paths 280 connect the drive side I/O drivers 226 of the second controller 220 to the drives 240. For example, second controller path A 284 provides a communication path between second controller drive side I/O drivers 226 and the volumes, e.g. volume 252, of drive-A 250.

The various communication paths, e.g. dedicated management communication path 116, host communication path 138, and inter-controller communication path 202, illustrated in FIG. 1, may be any of several well-known, standard communication media and protocols. For example, dedicated management communication path 116 between management system 110 and the first controller 210 may be a simple serial connection, a network connection, a SCSI connection, etc. Host communication path 138 connecting host system 130 and multipath driver 136 to controller 210 of storage subsystem 120 may be, for example, a parallel SCSI connection, a Fibre Channel connection, or any of several other standard communication media and protocols.

Figure 2:
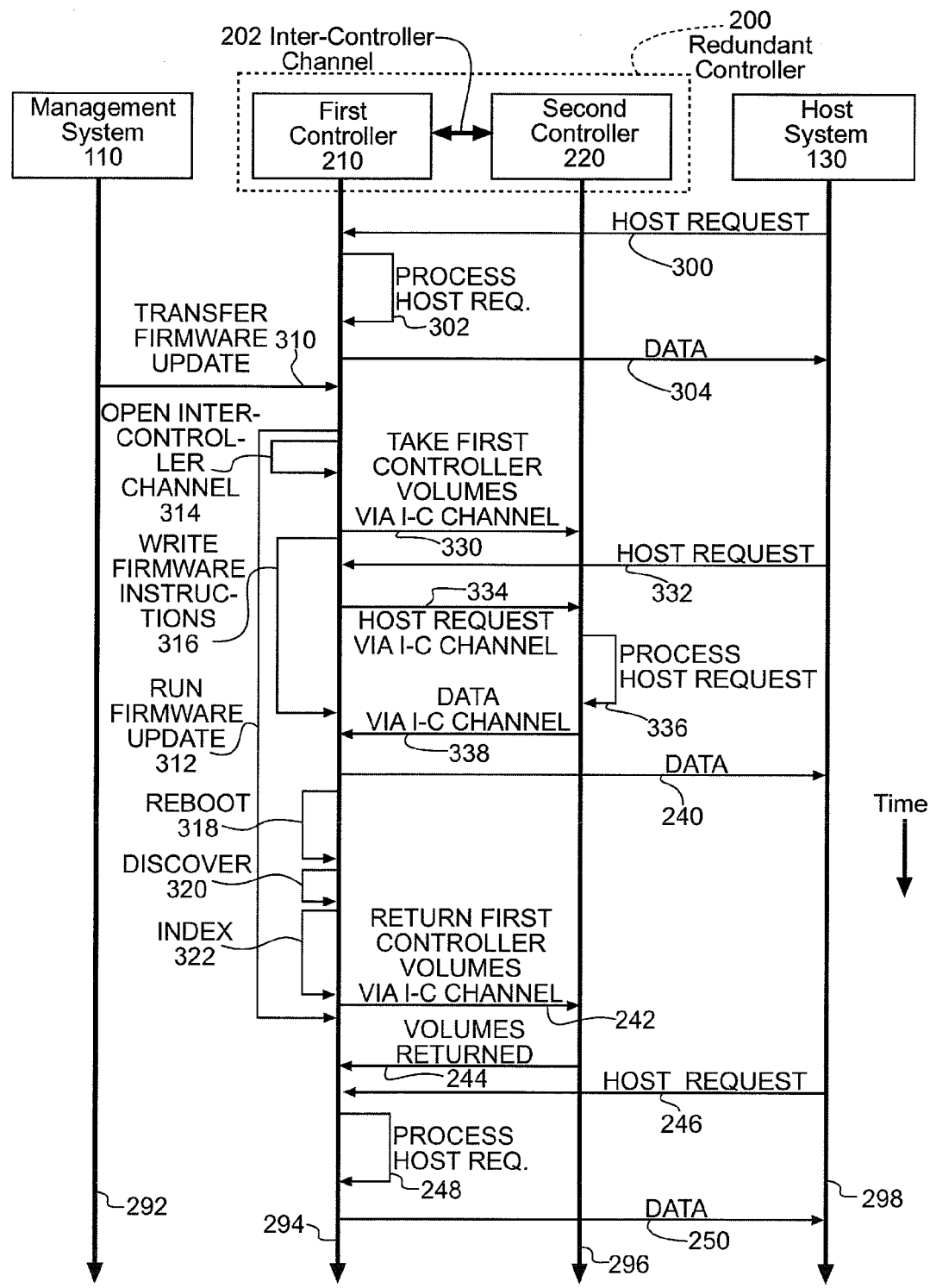
FIG. 2 is a timing diagram depicting a method used for exchanging information among various components of the system shown in FIG. 1 over time.

FIG. 2 is a timing diagram depicting one exemplary method for exchanging information among the various components shown in FIG. 1 over time. Downward pointing arrows 292, 294, 296, 298 are indicative of increasing time while the horizontally directed arrows depict an exchange of information in the direction of the arrows pointing from its origin to its final endpoint. The downward pointing arrows 292, 294, 296, 298 descend from each of four elements that participate in the updating process, namely: management system 110, first controller 210, second controller 220, and host system 130. As described herein, the horizontal directed arrows will be referred to simply as 'arrow X' where 'X' is the associated reference number.

Arrow 300, illustrated in FIG. 2, represents host request directed from the host system 130 through multipath driver 136 (FIG. 1) to the first controller 210 within a storage subsystem 120. Arrow 302 represents the normal processing of the host request with the first controller 210. Such normal processing of the host request is not part of the invention, but is illustrated to show normal processing prior to firmware updating according to the present embodiment is initiated. In response to the host request of arrow 300 and the resulting processing of the host request 302, host data is delivered to the host system 130, arrow 304. A plurality of host requests (e.g. arrow 300), processing of host requests (e.g. arrow 302) and delivery of data in response to the host requests (e.g. arrow 304) continue until the system 100 needs to be updated as described below. Arrow 310 indicates a transfer of a firmware update file by an administrative user of the management system 110 to request updating of firmware in the storage subsystem controllers (e.g. first controller 210). Specifically arrow 310 represents the transfer of an updated firmware file from the management system 110 to the first controller 210. In response to receipt of the firmware update file from the management system process 112, the process of running the firmware update begins indicated by arrow 312. The process of running the firmware update begins by opening the inter-controller communication path 202 (FIG. 1) indicated by arrow 314. After arrow 314, the process of writing the new firmware instructions indicated by arrow 316. After the firmware in first processor 210 has been updated indicated by arrow 316, the first controller 210 can reboot as indicated by arrow 318. Once the first controller 210 has rebooted, it is usually necessary to discover and index backend devices. This discovering process is indicated by arrow 320 while the indexing process is indicated by arrow 322. After the backend devices (e.g. drives 240) are indexed, the run firmware update process indicated by arrow 312 is completed.

With continued reference to FIG. 2, during the run firmware update process indicated by arrow 312, the first controller 210 can instruct the second controller 220 to take temporary ownership of volumes owned by the first controller as indicated by arrow 330. The instruction indicated by arrow 300 is sent via the inter-controller channel 202. Arrow 330 initiates that the second controller 220 begins to take temporary ownership of storage volumes presently owned by first controller 210, such as those illustrated by the first controller paths 242 (FIG. 1). From this point forward, and until instructed otherwise, a host request for volumes owned by first controller 210 will be forwarded to and processed by the second controller 220.

While running the firmware update process indicated by arrow 312, the host system 130 sends an host request for data owned by the first controller 210 as indicated by arrow 332, the first controller 210 forwards the host request via the inter-controller channel 202 to the second controller 220 indicated by arrow 334. The resulting processing of the host request is indicated by arrow 336 and the second controller eventually forwards data via the inter-controller channel 202 indicated by arrow 338. The first controller 210 forwards the data obtained by the second controller 220 as indicated by arrow 240. The process of forwarding the host request to the second controller 220 is 'invisible' to the host system 130 and therefore non-disruptive. Additional host requests (e.g. host request 332) can continue until the first controller 210 is fully operational again after the run firmware update indicated by arrow 312 is complete.

With continued reference to FIG. 2, after the downstream devices are discovered (arrow 320) and indexed (arrow 322), the first controller 210 can send instructions to the second controller 220 to return volumes as indicated by arrow 242. A request to return volumes (arrow 242) is sent via the inter-controller channel 202. The second controller 220 responds to the request to return the first controller's volumes via the inter-controller channel (arrow 242) by returning the volumes indicated by arrow 244. After the volumes are returned (arrow 244), a host request indicated by arrow 246 from the host system 130 for volumes owned by the first controller 210 are processed by the first controller 210 as indicated by arrow 248. Data obtained by the first controller 210 in response to the host request (arrow 246) is forwarded as data to host system 130 as indicated by arrow 250.

Figure 3:
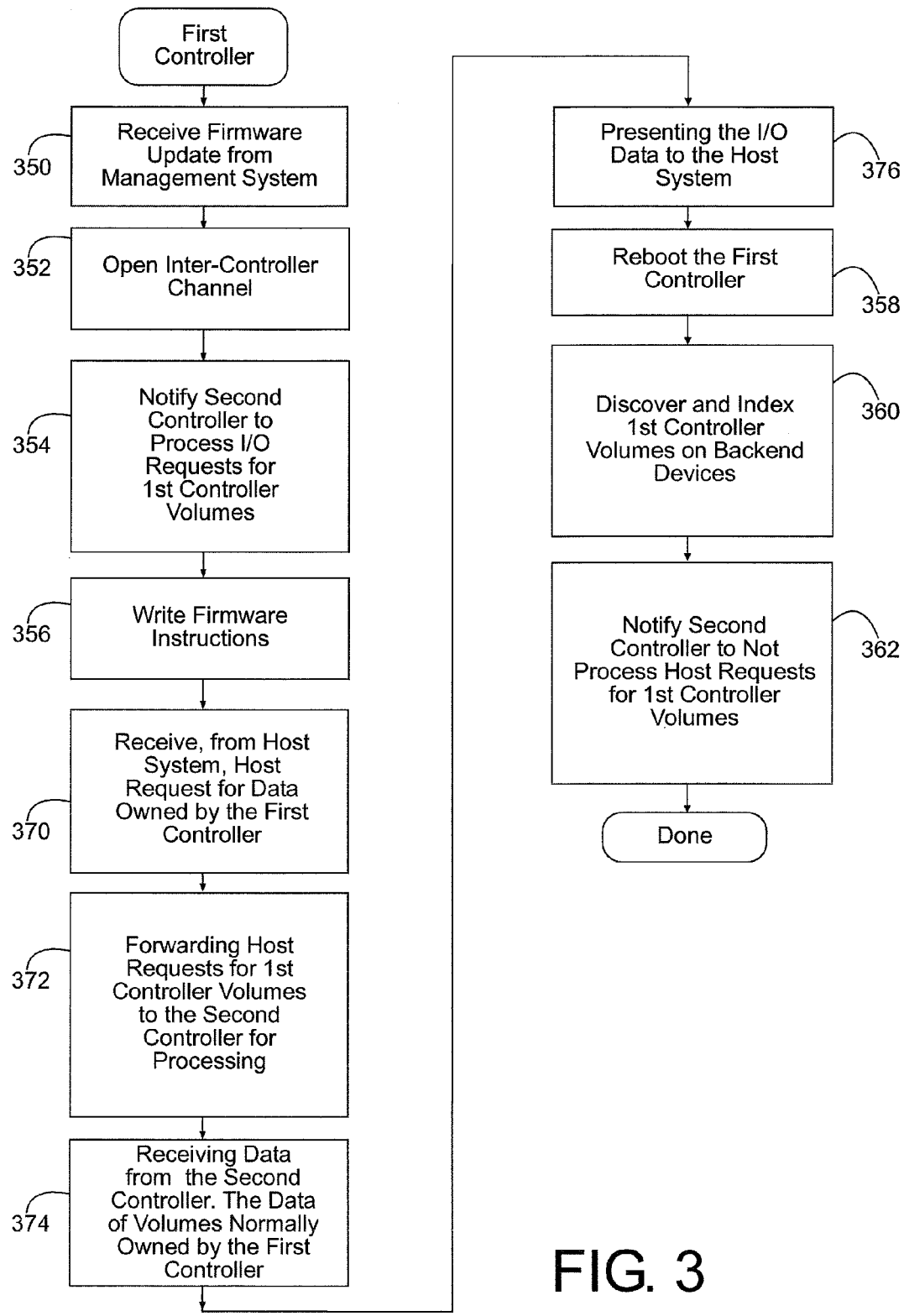
FIG. 3 is a flowchart showing actions taken in a first controller of the system illustrated in FIG. 1.
Figure 4:
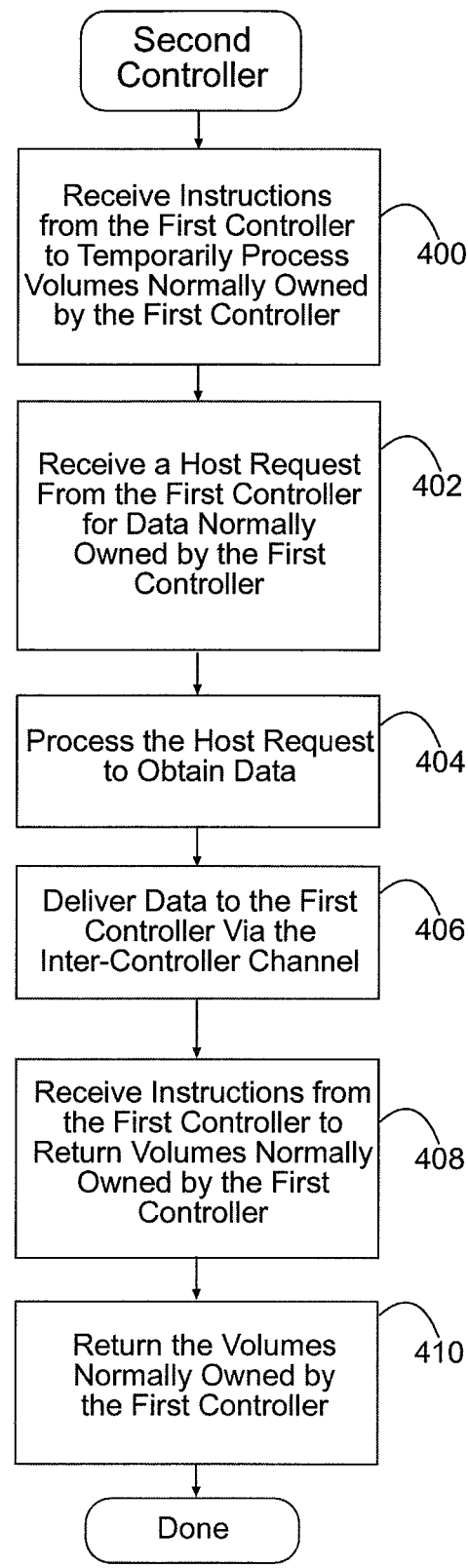
FIG. 4 is a flowchart showing actions taken in a second controller of the system illustrated in FIG. 1.

FIGS. 3 and 4 are flowcharts illustrating exemplary methods of updating the first controller 210 described above in FIG. 2. Specifically, FIG. 3 is a flowchart describing the processing within first controller 210 and FIG. 4 is a flowchart describing the processing that is performed within second controller 114 during the updating process of the first controller 210. The flowcharts of FIGS. 3 and 4 represent only a small portion of the total processing within such controllers. Only processes relating to updating and synchronization of the present methods are shown in flowcharts. Alternate design choices as to integration of these methods with the overall methods of operation of the storage controllers to perform storage management functions within the storage subsystem 120. Further, a variety of equivalent methods and techniques for coordinating the update process among two or more storage controllers may be utilized. The flowcharts of FIGS. 3 and 4 are therefore exemplary of one such embodiment of the methods.

FIG. 3 shows element 350 indicating that the first controller has received a firmware update from the management system. This firmware update comes from an administrative user operating the management system process 112 on the management system 110. Specifically, the firmware update request takes the form of the transfer of a formatted firmware file from the management client process 112 to the first controller 210 in the storage subsystem 120 via the dedicated management communication path 116. At element 352, the first controller 210 opens the inter-controller channel 202 to provide communication directly between the first and second controllers 210, 220. During element 354, the first controller 210 requests the second controller 220 to take ownership of all storage volumes presently owned by the first controller 210 illustrated by the first controller paths 242 (FIG. 1) thereby preparing the first controller 210 for the upgrade process. During upgrade of the firmware, the first controller 210 is unable to process any host request 132 generated from the host system 130. By taking over ownership of the volumes normally owned by the first controller 210, the second controller 220 continues to process the host request 132 for the first controller's volumes, e.g. drive-A volume 252. Until instructed later (e.g. element 362), the present method provides a seamless firmware upgrade in that the host system 130 does not notice any interruptions in gaining access to the drives 240 of the storage subsystem 120. Rather, the storage subsystem 120 continues to operate essentially normally during the firmware upgrade procedure.

As further shown in FIG. 3, the flowchart continues with element 356 wherein the first controller 210 writes the firmware instructions to the device access layer 214. At some point after writing the firmware instructions indicated by element 356, the first controller 210 reboots as illustrated with element 358 to initiate operation of the first controller 210 with the updated firmware. Upon rebooting the first controller 210, element 358, backend devices like drives 240 attached to the first controller 210 need to be discovered and indexed as indicated in element 360. After the backend devices have been discovered and indexed, element 360, the first controller 210 notifies the second controller 220 to return volumes normally owned by the first controller is indicated by element 362. The above description describes an exemplary process for updating the firmware of the first controller 210.

As also illustrated in FIG. 3, at any time after the first controller notifies the second controller 220 to takeover processing of volumes normally owned by the first controller 210 (element 356) and before the first controller notifies the second controller 220 to return volumes normally owned by the first controller 210 (element 362), the host system 130 may send a host request 132 for data owned by the first controller 210. The flowchart of FIG. 3 has elements indicated with a double-line. These double-lined elements are movable in and repeated in the exemplary flowchart of FIG. 3. However, one exemplary host request may be received by the first controller 210 for volumes normally owned by the first controller 210 as indicated by element 370. Because the first controller 210 has transferred processing for this volume to the second controller 220, the first controller 210 forwards the host request 132 to the second controller 220 for processing as indicated in element 372. The second controller 220 processes the host request for the volume(s) owned by the first controller 210 and eventually receives data in response to the host request that is forwarded to and received by the first controller via the inter-controller channel 202 as indicated in element 374. The first controller 210 presents the data 134 to the host system 130 from the host-side I/O drivers 112 and the host communication path 138 as indicated in element 376.

FIG. 4 shows the flowchart describing the processing within second controller 220 during the updating of the first controller 210 commencing with element 400, receipt of instructions from the first controller 210 to temporarily process volumes normally owned by the first controller 210. Next, the second controller 220 receives a host request from the first controller 210 for data normally owned by the first controller 210, element 402. The second controller 220 processes the host request to obtain data from the drives 240 in flowchart element 404 and delivers the data to the first controller 210 via the inter-controller channel 202 (FIG. 1) in element 406. This processing of host requests continues until the second controller 220 receives instructions from the first controller to return volumes normally owned by the first controller, element 408. The second controller 220 confirms the receipt indicated in element 408 by returning the volumes normally owned by the first controller, element 410.

A general flow of the host request 132 through the system 100 updating of the first controller 210 is provided in FIG. 1 to illustrate the embodiment. With reference to FIG. 1, the host request 132 travels from the host system multipath driver 136 to the first controller host-side I/O drivers 212. Because the inter-controller channel 202 has been opened, the host request 132 travels from the host-side I/O drivers 212 to the second controller device access layer 224 via the first controller inter-controller messaging and RDMA 218, the inter-controller channel 202 and the second controller inter-controller messaging and RDMA 228. The second controller device access layer 224 processes the request and sends the host request 132 to the drives 240 via the second controller paths 280 and the second controller drive-side I/O drivers 226. The data 134 requested in the host request 132 travels from the drives 240 through the second controller paths 280 to the second controller drive-side I/O drives 226. The data continues through the device access layer 224 and the inter-controller messaging and RDMA 228 of the second controller 220. The data travels from the second controller inter-controller messaging and RDMA 228 to the first controller inter-controller messaging and RDMA 218 via the inter-controller channel 202. The data continues from the first controller inter-controller messaging and RDMA 218 to the host side I/O drivers 212 and ultimately the host system 130 via the host communication path 138. The above process describes one exemplary flow of the host request 132 and the data 134 requested therein through the system 100 while the first controller 210 is updating.

It can be appreciated that the above embodiments allow at least one controller of the storage subsystem 120 to be updated while processing host requests 132 from the host system 130. During the non-disruptive updating, the updating first controller 210 redirects the host request 132 for data 134 owned by the first controller 210 to the operating second controller 220 of the redundant controller 200. After the second controller 220 obtains data 134 identified in the host request 132, the operating second controller 220 transfers the data 134 to the updating first controller 210 via an inter-controller channel 202. Once the updating first controller 210 receives the data 134, the first controller 210 presents the data to the host system 130. The host system 130 doesn't detect that the first controller 210 is updating because the updating process is invisible to the host system 130.

The present embodiments can be applied to a number of devices and in a number of manners. With reference to FIG. 1, one example may include more then two controllers in the redundant controller 200. The first controller 210 is often identified as a primary controller and is responsible for initially receiving the updated firmware file and other management functions provided by management system 110 via dedicated management communication path 116. Any number of additional controllers similar to the second controller 220 may operate in conjunction with primary first controller 210. The methods presented herein are presumed to be performed between a first controller 210 and a single second controller 220. Extension of these methods to multiple controllers is a matter of design choice.

In another alternative embodiment, these methods can be employed when a simple reboot is required (i.e. firmware updating is not required). In this alternative embodiment, the firmware update file would include a reboot instruction and not any instructions overwriting the program instructions for the controllers (e.g. first controller 210).

In another alternative embodiment, the second controller 220 of the redundant controller 200 is updated by receiving the firmware update from the first controller 210 via the inter-controller channel 202. The firmware update includes instructions that cause the second controller 220 to notify the first controller 210 to take over volumes normally owned by the second controller 220. After notifying the first controller 210 to take over processing of its volumes, the second controller 220 forwards any host requests received by the host-side I/O drives 222 to the first controller inter-controller messaging and RDMA 218 via the inter-controller channel 202. The host request received by the first controller inter-controller messaging and RDMA 218 is processed with the device access layer 214 and data is obtained via the drive-side I/O drives 216 and the first controller paths 242. Such processing of host requests data normally owned by the second controller 220 continues until the second controller 220 has completed its updating process as instructed by the firmware update (e.g. updating the firmware controller program instructions, rebooting, discovering and indexing). Once the second controller 220 has been updated, normal operating processes for the storage subsystem 120 can be restored.

The foregoing description of the invention has been presented for purposes of illustration and description. It is not intended to be exhaustive or to limit the invention to the precise form disclosed, and other modifications and variation may be possible in light of the above teachings. The embodiment was chosen and descried in order to best explain the principles of the invention and its practical applications to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A non-disruptive method for updating firmware in a storage subsystem so that said updating is transparent to a host system that sends a host request for data located in said storage subsystem, said method comprising:

providing a redundant controller in said storage subsystem, said redundant controller comprising a first controller and a second controller;
opening an inter-controller channel inside said redundant controller between said first controller and said second controller for communicating said host request and said data between said first controller and said second controller;
receiving a firmware file in said first controller from a management system, said firmware file comprising: metadata describing the content of said firmware file and controller program instructions;
routing said host request for data owned by said first controller to said second controller via said inter-controller channel after said receiving said firmware file;
processing said host request with said second controller for said data owned by said first controller, which causes said data to be presented to said second controller, after said routing said host request for data owned by said first controller;
transferring said data from said second controller to said first controller via said inter-controller channel;
presenting said data from said first controller to said host system; and
updating said firmware in said first controller according to said firmware file controller program instructions during at least one of said routing, said processing, said transferring, and said presenting processes.

2. The method of claim 1 and further comprising:
restoring processing of said host request for data owned by said first controller from said host system in said first controller after said updating said firmware in said first controller.

3. The method of claim 1 and further comprising:
transferring said firmware file controller programming instructions from said first controller to said second controller via said inter-controller channel;
routing another host request for another data owned by said second controller from said second controller to said first controller via said inter-controller channel after said transferring said firmware file programming instructions;
processing said another host request within said first controller for said another data owned by said second controller, said processing causing said another data to be presented to said first controller;
transferring said another data from said first controller to said second controller;
presenting said another data from said second controller to said host system; and
updating said firmware in said second controller according to said firmware file controller program instructions during at least one of said routing said another host request for another data owned by said second controller, said processing said another host request within said first controller, said transferring said another data from said first controller, and said presenting said another data from said second controller.

4. The method of claim 1 and further comprising:
rebooting said first controller after said updating; and
discovering backend devices after said rebooting.

5. The method of claim 4 and further comprising:
indexing said backend devices after said discovering said backend devices.

6. The method of claim 1 wherein said storage subsystem comprises a redundant array of inexpensive devices.

7. A non-disruptive method for updating a storage subsystem having a redundant controller so that said updating is transparent to a host system that sends a host request for data located in a storage subsystem controlled by said redundant controller, said method comprising:
providing a first controller and a second controller in said redundant controller;
opening an inter-controller channel connected between said first controller and said second controller for communicating said data between said first controller and said second controller;
receiving a firmware file in said first controller from a management system, said firmware file comprising at least a reboot command;
routing said host request for data owned by said first controller to said second controller via said inter-controller channel after receiving said firmware file;
processing said host request with said second controller for said data owned by said first controller, which causes said data to be presented to said second controller, after said routing said host request for data owned by said first controller;
transferring said data from second controller to said first controller via said inter-controller channel;
presenting said data from said first controller to said host system; and
rebooting said first controller according to said firmware file reboot command during at least one of said routing, said processing, said transferring, and said presenting processes.

8. The method of claim 7 and further comprising:
providing a discover command in said firmware file; and
discovering volumes owned by said first controller after said rebooting said first controller.

9. The method of claim 8 and further comprising:
providing an index command in said firmware file; and
indexing volumes owned by said first controller after said discovering said volumes owned by said first controller.

10. The method of claim 7 wherein said storage subsystem comprises a redundant array of inexpensive devices.

11. A storage subsystem, said subsystem comprising:
a first controller;
a second controller; and
an inter-controller channel configured to communicate between said first and second controllers,
wherein said first controller is configured to:
receive a host request from a host system wherein said host request corresponds to data owned by said first controller;
route said host request from said first controller to said second controller via said inter-controller channel;
receive said data from said second controller at said first controller via said inter-controller channel;
present said data from said first controller to said host system; and
update firmware of said first controller according to a received firmware update while performing at least one of routing said host request from said first controller to said second controller, receiving said data from said second controller, and presenting said data to said host system.

12. The storage subsystem of claim 11, wherein said inter-controller channel comprises a remote direct memory access (RDMA) channel.

13. The storage subsystem of claim 11, further comprising:
a host communication path connecting said first controller to said host system;

wherein said host communication path comprises one of a parallel SCSI connection and a Fibre Channel connection.

14. The storage subsystem of claim 11, further comprising:
a management system for transmitting said firmware update to said first controller and
a dedicated management communication path connecting said management system and said first controller.

15. The storage subsystem of claim 14, wherein said dedicated management communication path comprises one of a simple serial connection, a network connection, and a small computer system interface (SCSI) connection.

16. The storage subsystem of claim 11, further comprising:
one or more drives in communication with said first and second controllers and subdivided into one or more volumes;
wherein said firmware update includes a discover command; and
wherein said first controller is further configured to discover ones of said volumes owned by said first controller after updating firmware of said first controller in response to said discover command.

17. The storage subsystem of claim 16,
wherein said firmware update further includes an index command; and
wherein said first controller is further configured to index said volumes owned by said first controller after discovering said volumes owned by said first controller in response to said index command.

18. The storage subsystem of claim 11, further comprising:
a redundant array of inexpensive disks (RAID) in communication with said first and second controllers and subdivided into one or more volumes;

wherein said first controller is further configured to perform storage management processes on ones of said one or more volumes owned by said first controller; and
wherein said second controller is configured to perform storage management processes on ones of said one or more volumes owned by said second controller.

19. The method of claim 7 and further comprising:
transferring said firmware file from said first controller to said second controller via said inter-controller channel;
routing another host request for another data owned by said second controller from said second controller to said first controller via said inter-controller channel after said transferring said firmware file;
processing said another host request within said first controller for said another data owned by said second controller, said processing causing said another data to be presented to said first controller;
transferring said another data from said first controller to said second controller;
presenting said another data from said second controller to said host system; and
rebooting said second controller according to said firmware file reboot command during at least one of said routing said another host request for another data owned by said second controller, said processing said another host request within said first controller, said transferring said another data from said first controller, and said presenting said another data from said second controller.

20. The method of claim 7 and further comprising:
restoring processing of said host request for data owned by said first controller from said host system in said first controller after said rebooting said first controller.

* * * * *